United States Patent
Arora et al.

(10) Patent No.: US 7,692,724 B2
(45) Date of Patent: Apr. 6, 2010

(54) METHOD AND APPARATUS TO SYNCHRONIZE AUDIO AND VIDEO

(75) Inventors: Manish Arora, Suwon-si (KR); Serguei Larcycguin, Suwon-si (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1367 days.

(21) Appl. No.: 11/124,092

(22) Filed: May 9, 2005

(65) Prior Publication Data

US 2006/0078305 A1   Apr. 13, 2006

(30) Foreign Application Priority Data

Oct. 12, 2004   (KR)   ...................... 10-2004-0081358

(51) Int. Cl.
   *H04N 9/475*   (2006.01)
(52) U.S. Cl. .......................... 348/515; 348/512; 348/473
(58) Field of Classification Search ................. 348/515, 348/512, 518–519, 473, 476, 478, 192, 180, 348/699–700, 412, 415–416, 405

See application file for complete search history.

(56) References Cited

U.S. PATENT DOCUMENTS

| | | | | |
|---|---|---|---|---|
| 4,963,967 A | * | 10/1990 | Orland et al. ................ | 348/484 |
| 5,243,424 A | * | 9/1993 | Emmett ........................ | 348/484 |
| 5,751,378 A | * | 5/1998 | Chen et al. ................... | 348/700 |
| 5,844,607 A | * | 12/1998 | Gebler et al. ................ | 375/240.01 |
| 6,480,902 B1 | * | 11/2002 | Yuang et al. ................. | 709/248 |
| 6,836,295 B1 | * | 12/2004 | Cooper ........................ | 348/515 |

FOREIGN PATENT DOCUMENTS

| | | |
|---|---|---|
| JP | 07-143525 | 6/1995 |
| JP | 08-098133 | 4/1996 |
| JP | 10-304242 | 11/1998 |
| JP | 2000-278653 | 10/2000 |
| JP | 2003-092761 | 3/2003 |
| JP | 2003-158643 | 5/2003 |
| KR | 1998-086039 | 5/1998 |

OTHER PUBLICATIONS

Dutch Search Report dated Mar. 29, 2007 issued in Dutch Patent Application No. 1030173.
Emmett J R: "Maintaining audio and video synchronization with cancelled markers" International Broadcasting Convention, Sep. 16, 1994, bladzijden; 146-151.

* cited by examiner

*Primary Examiner*—Trang U Tran
(74) *Attorney, Agent, or Firm*—Stanzione & Kim, LLP

(57) ABSTRACT

A method and an apparatus to synchronize an audio signal and a video signal. The method includes: displaying video on a screen that corresponds to an audio signal including a high frequency component having a predetermined pattern inserted therein to indicate when a scene change occurs in a video signal, detecting a scene change in the displayed video and detecting the high frequency component having the predetermined pattern in the audio signal, calculating a time difference between a time when the scene change is detected in the displayed video and a time when the high frequency component having the predetermined pattern is detected in the audio signal, and controlling delay times of the audio signal and the video signal according to the calculated time difference. Accordingly, the audio signal and the video signal can be automatically synchronized without performing a separate measuring operation.

31 Claims, 5 Drawing Sheets

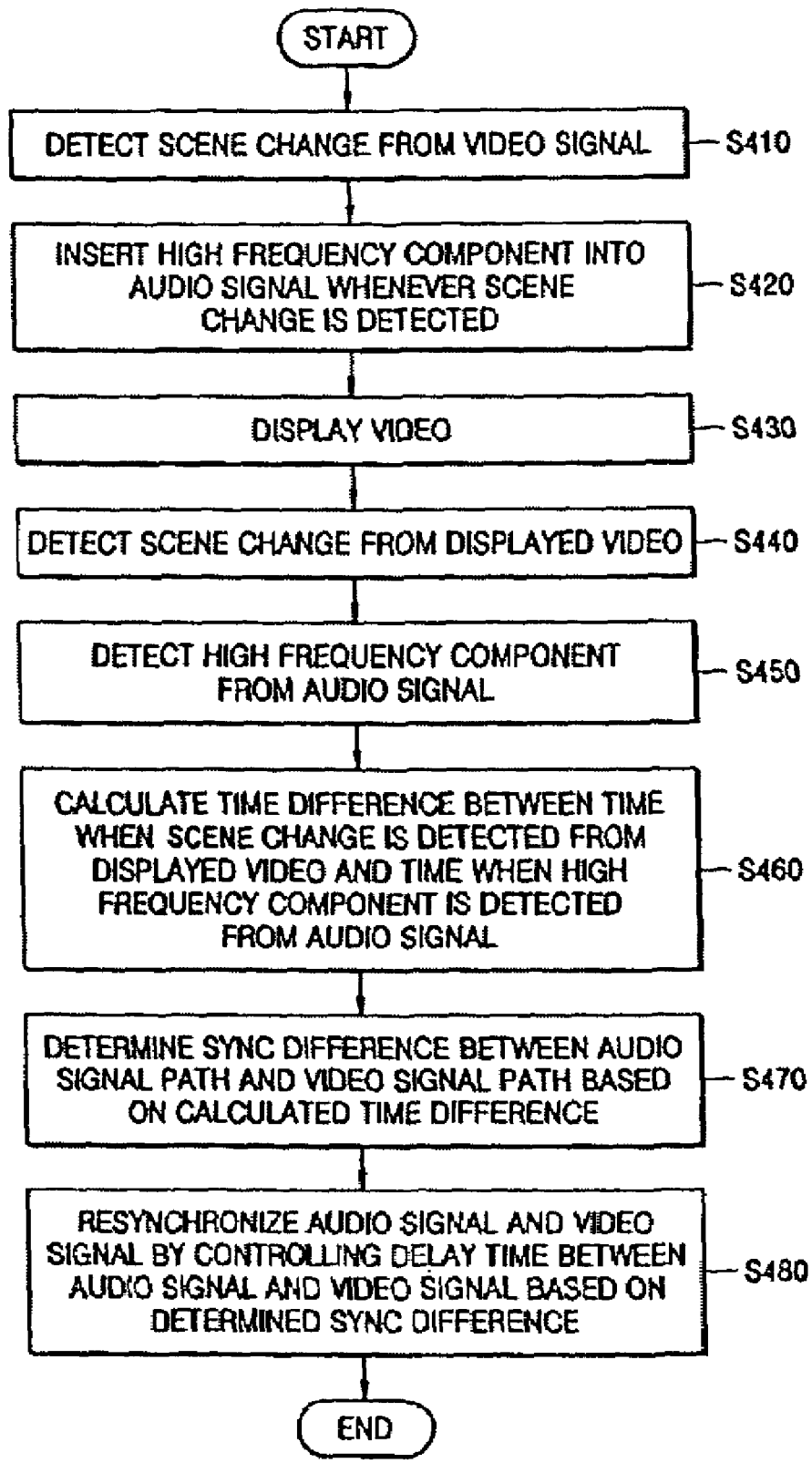

METHOD AND APPARATUS TO SYNCHRONIZE AUDIO AND VIDEO

CROSS-REFERENCE TO RELATED APPLICATIONS

This application claims priority from Korean Patent Application No. 2004-81358, filed on Oct. 12, 2004, in the Korean Intellectual Property Office, the disclosure of which is incorporated herein in its entirety by reference.

BACKGROUND OF THE INVENTION

1. Field of the Invention

The present general inventive concept relates to a method and an apparatus to synchronize an audio signal and a video signal, and more particularly, to a method and an apparatus to synchronize an audio signal and a video signal in multimedia.

2. Description of the Related Art

Since common multimedia, such as VCDs and DVDs, and common multimedia file formats, such as AVI, store audio and video synchronization information, an audio stream and a video stream are synchronized after decoding. However, even though an audio signal and a video signal decoded to suit a TV or a storage medium are synchronized, a user still experiences audio/video timing difference errors and lip synchronization errors since various delays in the audio signal and the video signal can cause significant lip synchronization problems.

Processing operations performed on the audio and video signals after the audio and video signals have been decoded and synchronized (i.e., post processing) can cause the various delays. The post processing includes audio signal amplification, an actual display procedure, and other factors. The delays added in audio and video signal paths may cause the audio signal and the video signal to be unsynchronized.

FIG. 1A is a block diagram illustrating a first conventional audio and video synchronizing apparatus. Referring to FIG. 1, a decoded audio signal is delayed by an audio delay unit 102 for a first predetermined time. An information format or mark of the delayed audio signal is changed by an audio post processing unit 104 before the audio signal is finally output. The changed audio signal is amplified by an amplifier 106 and reproduced by a speaker 108.

A decoded video signal is delayed by a video delay unit 112 for a second predetermined time. An information format or mark of the delayed video signal is changed by a video post processing unit 114 before the video signal is finally output. The changed video is displayed by a display unit 118.

A user manually inputs audio signal delay parameters according to the audio signal reproduced by the speaker 108 and the video signal reproduced by the display unit 118. The audio signal is matched to the video signal by a delay time of the audio delay unit 102 controlled according to the input audio signal delay parameters input by the user. Accordingly, the audio signal and the video signal may be resynchronized.

Alternatively with respect to the first conventional audio and video synchronizing apparatus, the user manually inputs video signal delay parameters. The video signal is then matched to the audio signal by a delay time of the video delay unit 112 controlled according to the input video signal delay parameters.

FIG. 1B is a block diagram illustrating a second conventional audio and video synchronizing apparatus. The second conventional audio and video synchronizing apparatus includes some of the same elements as the first conventional audio and video synchronizing apparatus of FIG. 1. Referring to FIG. 1B, the second conventional audio and video synchronizing apparatus performs a separate measuring operation to measure characteristics of audio and video signals using external sensors. In the measuring operation, a switch 152 is connected to a contact point 'a,' and an audio video synchronization unit 154 outputs synchronized audio and video test signals. The audio test signal is output from the speaker 108 after passing through the audio delay unit 102, the audio post processing unit 104, and the amplifier 106. The video test signal is displayed by the display unit 118 after passing through the video delay unit 112 and the video post processing unit 114.

The audio test signal output from the speaker 108 is received by a microphone 156, and the video test signal displayed by the display unit 118 is sensed by a light sensor 158.

The audio video synchronization unit 154 measures a time difference between a time when the audio test signal is received by the microphone 156 and a time when the video test signal is sensed by the light sensor 158. The measured time difference indicates a delay time of the audio test signal with respect to the video test signal, and vice versa.

The audio video synchronization unit 154 synchronizes the audio test signal and the video test signal by controlling a variable delay time of the audio delay unit 102 or the video delay unit 112 according to the measured delay time of the audio test signal with respect to the video test signal.

When the measuring operation is complete, decoded audio/video signals are reproduced by switching the switch 152 to a contact point 'b.'

However, the first conventional audio and video synchronizing apparatus has a disadvantage in that a user is required to manually input audio signal delay parameters in order to resynchronize the audio signal and the video signal.

Additionally, the second conventional audio and video synchronizing apparatus has a disadvantage in that a separate measuring operation is required. Therefore, the separate measuring operation must be performed every time an audio or video signal path is changed (i.e., whenever a post processing operation is performed on either the audio signal or the video signal).

SUMMARY OF THE INVENTION

The present general inventive concept provides an audio and video synchronization apparatus to automatically synchronize an audio signal and a video signal without performing a separate measuring operation using detection of scene changes in the video signal.

The present general inventive concept also provides a synchronization method of automatically synchronizing an audio signal and a video signal without performing a separate measuring operation using detection of scene changes in the video signal.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing an audio and video synchronization apparatus comprising a first scene change detector to calculate a luminance level difference between frames of a video signal and to detect whether the luminance level difference is greater than a predetermined threshold value, a high frequency inserter to insert a high frequency component having a predetermined pattern into an audio signal whenever the first scene detector detects that the luminance level difference is greater than the predetermined threshold value, a signal detector to calculate a luminance level difference between frames from a screen on which the video is displayed, to detect whether the luminance level difference is greater than a predetermined threshold value, and to detect the inserted high frequency component in the audio signal, a sync difference calculator to calculate a time difference between a time when the signal detector detects that the luminance level difference is greater than the predetermined threshold value and a time when the high frequency component is detected by the signal detector, and a delay unit to control buffering of the audio signal and the video signal according to the time difference calculated by the sync difference calculator.

The foregoing and/or other aspects and utilities of the present general inventive concept are also achieved by providing an audio and video synchronization method comprising displaying video on a screen including an audio signal including a high frequency component having a predetermined pattern inserted therein to indicate when a scene change occurs in a corresponding video signal detecting a scene change in the displayed video and detecting the high frequency component having the predetermined pattern in the audio signal, calculating a time difference between a time when the scene change is detected in the displayed video and a time when the high frequency component having the predetermined pattern is detected in the audio signal, and controlling delay times of the audio signal and the video signal according to the calculated time difference.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 4 is a flowchart illustrating an audio and video synchronizing method according to an embodiment of the present general inventive concept.

DETAILED DESCRIPTION OF THE PREFERRED EMBODIMENTS

Figure 1A:
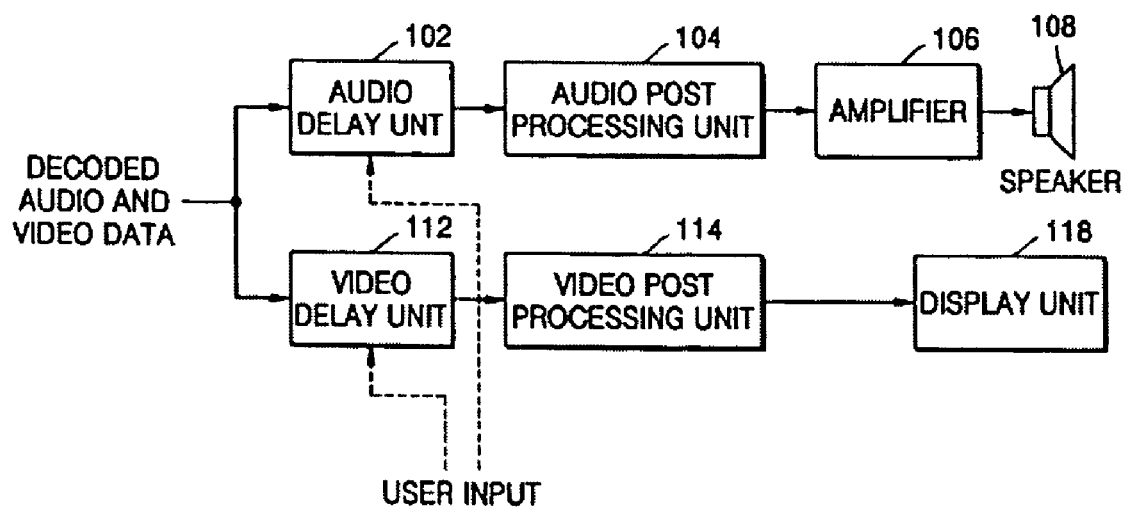
FIG. 1A is a block diagram illustrating a first conventional audio and video synchronizing apparatus.
Figure 1B:
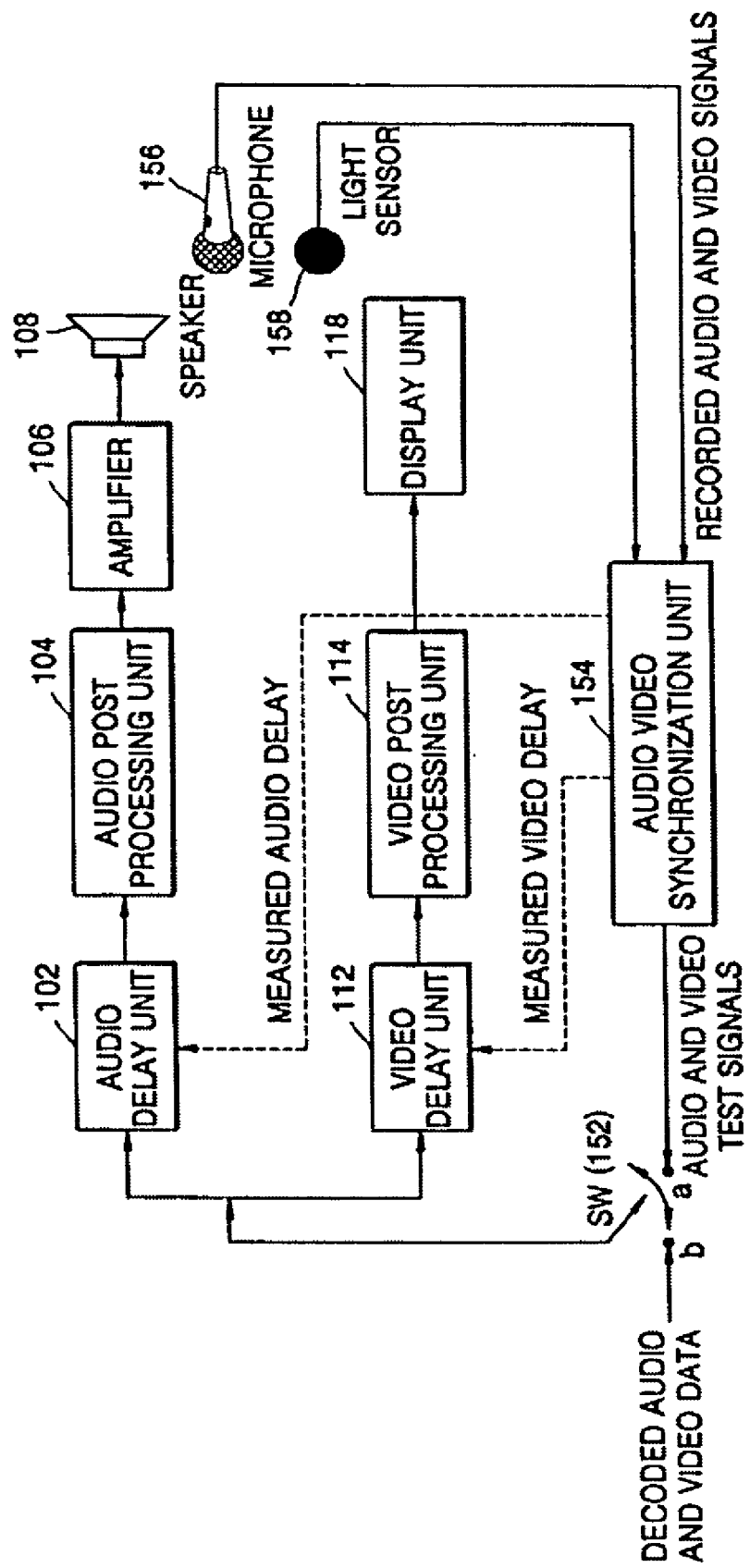
FIG. 1B is a block diagram illustrating a second conventional audio and video synchronizing apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
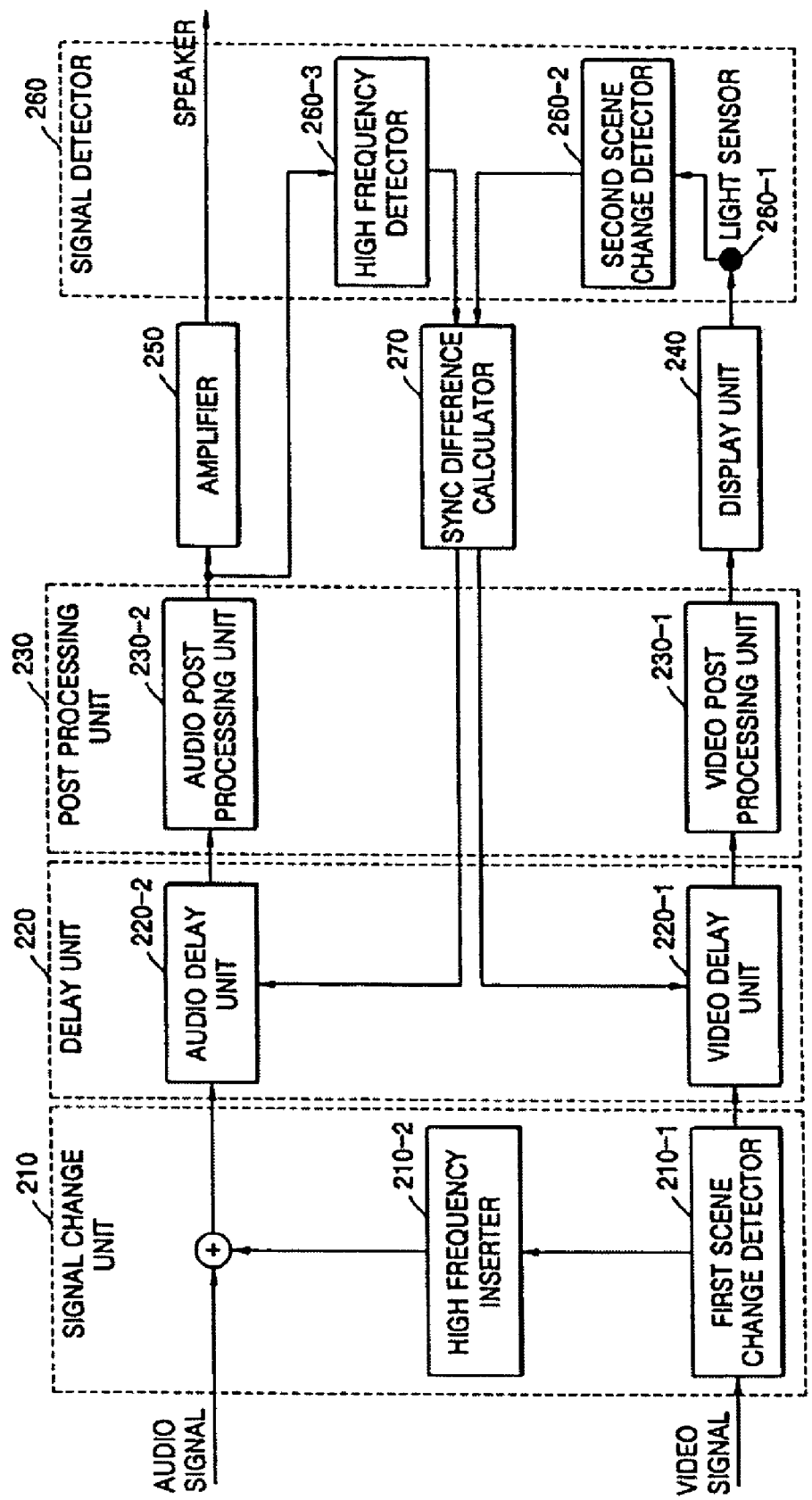
FIG. 2 is a block diagram illustrating an audio and video synchronizing apparatus according to an embodiment of the present general inventive concept.

FIG. 2 is a block diagram illustrating an audio and video synchronizing apparatus according to an embodiment of the present general inventive concept. Referring to FIG. 2, the audio and video synchronizing apparatus includes a signal change unit 210, a delay unit 220, a post processing unit 230, a display unit 240, an amplifier 250, a signal detector 260, and a sync difference calculator 270.

The signal change unit 210 includes a first scene change detector 210-1 and a high frequency inserter 210-2.

The first scene change detector 210-1 calculates a luminance level difference between frames of a video signal and detects whether the luminance level difference is greater than a predetermined threshold value.

In other words, the first scene change detector 210-1 detects a luminance level for each pixel of each frame of the video signal. In particular, the first scene change detector 210-1 calculates a difference between a luminance level of a current frame and a luminance level of a previous frame for each pixel. The first scene change detector 210-1 calculates the luminance level difference between the current and previous frames by accumulating absolute values of the differences of luminance levels of all the pixels. The first scene change detector 210-1 detects whether the calculated luminance level difference is greater than the predetermined threshold value.

If the luminance level difference is greater than the predetermined threshold value, the first scene change detector 210-1 determines that a scene change has occurred in the video signal. If the luminance level difference is smaller than the predetermined threshold value, the first scene change detector 210-1 determines that a scene change has not occurred in the video signal.

The high frequency inserter 210-2 inserts a high frequency component into an audio signal whenever the first scene detector 210-1 detects that the luminance level difference is greater than the predetermined threshold value. The inserted high frequency component is inaudible.

The delay unit 220 includes a video delay unit 220-1 and an audio delay unit 220-2. For example, the video delay unit 220-1 and the audio delay unit 220-2 may be buffers. The buffers may be variable.

The video delay unit 220-1 buffers the video signal output from the first scene change detector 210-1. The video delay unit 220-1 delays outputting the video signal by buffering the video signal for a first predetermined time.

The audio delay unit 220-2 buffers the audio signal changed by the high frequency inserter 210-2 of the signal change unit 210. The audio delay unit 220-2 delays outputting the audio signal by buffering the audio signal for a second predetermined time.

The post processing unit 230 includes a video post processing unit 230-1 and an audio post processing unit 230-2. The post processing unit 230 may cause the audio signal and the video signal to be unsynchronized, thereby causing a lip sync problem and other timing difference problems.

The video post processing unit 230-1 performs additional processes with respect to the video signal before the video signal is output. That is, an information format or mark of the video signal output from the video delay unit 220-1 may be changed by the video post processing unit 230-1. The video post processing unit 230-1 may perform the additional processes, such as color enhancement, detail enhancement, and contrast and brightness enhancement, with respect to the video signal.

The audio post processing unit 230-2 may perform additional processes with respect to the audio signal before the audio signal is output. That is, an information format or mark of the audio signal output from the audio delay unit 220-2 may be changed by the audio post processing unit 230-2. The audio post processing unit 230-2 may perform the additional processes, such as 3D audio processing, virtualizing, bass enhancement, and dialog and clarity enhancement, with respect to the audio signal.

The display unit 240 displays the video signal output by the video post processing unit 230-1. The amplifier 250 amplifies the audio signal output by the audio post processing unit 230-2.

The signal detector 260 calculates a luminance level difference between frames (i.e., consecutive frames) from a screen on which the video is displayed, detects whether the luminance level difference is greater than a predetermined threshold value, and detects the inserted high frequency component in the audio signal output by the audio post processing unit 230-2.

The signal detector includes a light sensor 260-1, a second scene change detector 260-2, and a high frequency detector 260-3.

The light sensor 260-1 senses a luminance level of each frame from the displayed video.

The second scene change detector 260-2 calculates the luminance level difference between frames according to the luminance level of each pixel of each frame sensed by the light sensor 260-1. The second scene change detector 260-2 detects whether the calculated luminance level difference is greater than a predetermined threshold value.

If the luminance level difference is greater than the predetermined threshold value, the second scene change detector 260-2 determines that a scene change has occurred in the video signal. If the luminance level difference is smaller than the predetermined threshold value, the second scene change detector 260-2 determines that a scene change has not occurred in the video signal.

The high frequency detector 260-3 detects a high frequency inserted into the audio signal. In particular, the high frequency detector 260-3 detects the high frequency component inserted by the high frequency inserted 210-2.

The sync difference calculator 270 calculates a time difference between a time when the second scene change detector 260-2 detects that the luminance level difference is greater than the predetermined threshold value and a time when the high frequency component is detected by the high frequency detector 260-3. The calculated time difference corresponds to a sync difference between the audio signal and the video signal.

The delay unit 220 controls buffering of the audio signal and the video signal according to the time difference calculated by the sync difference calculator 270. That is, the delay unit 220 controls output delay times of the audio signal and the video signal according to the calculated time difference.

Figure 3:
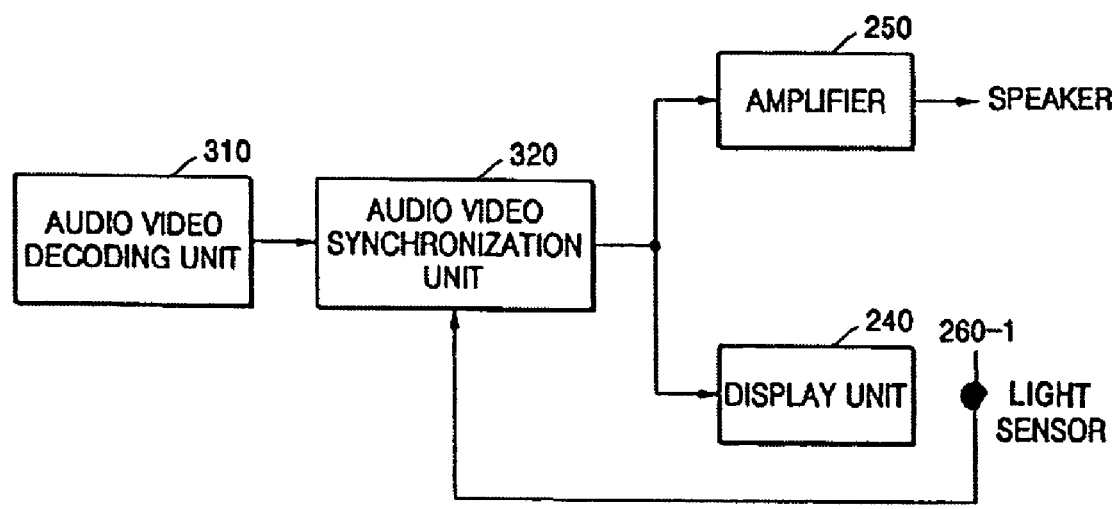
FIG. 3 is a block diagram illustrating another configuration of the audio and video synchronizing apparatus of FIG. 2.

FIG. 3 is a diagram illustrating another configuration of the audio and video synchronizing apparatus of FIG. 2. Referring to FIG. 3, an audio video decoding unit 310 decodes an audio signal and a video signal.

An audio video synchronization unit 320 is composed of one unit including the signal change unit 210 of FIG. 2, the delay unit 220 of FIG. 2, the post processing unit 230 of FIG. 2, the second scene change detector 260-2 of FIG. 2, the high frequency detector 260-3 of FIG. 2, and the sync difference calculator 270 of FIG. 2.

As illustrated in FIG. 3, the display unit 240, the amplifier 250, and the light sensor 260-1 may be configured as separate units.

The audio and video synchronizing apparatus illustrated in FIG. 3 is typically applied to a system in which the display unit 240 and a speaker are independent of each other. In the audio and video synchronizing apparatus illustrated in FIG. 3, the display unit 240 is independent from a path of the audio signal. For example, the audio and video synchronizing apparatus can be applied to DVDs and AV reception systems, which decode audio signals and video signals independently or together, using external speakers with a TV, or a projector to display the video.

In the audio and video synchronizing apparatus of FIG. 3, delays added to a path of the video signal due to post-processing prior to reaching the display unit 240 cannot be corrected by the display unit 240. The audio video synchronization unit 320 synchronizes the audio signal and the video signal by correcting the delays.

FIG. 4 is a flowchart illustrating an audio and video synchronizing method according to an embodiment of the present general inventive concept. Referring to FIGS. 2 and 4, after initially synchronized audio and video signals are processed, a time difference caused by flow of the processed audio and video signals is analyzed by checking a synchronization mark.

A scene change of the video signal is a frame that is actually different from a previous frame. The scene change of the video signal typically occurs frequently. The scene change quickly changes characteristics of the video signal as compared with the previous frame.

When the scene change occurs, an original audio signal is changed by adding a special audio signal to the original audio signal. This audio signal change is easily detected without adding audible noise to the original audio signal. For example, the special audio signal may comprise a high frequency component. Accordingly, a time difference between an audio signal path and a video signal path is detected.

Decoded audio and video signals are input to the audio and video synchronizing apparatus. The first scene change detector 210-1 detects a scene change from the video signal in operation S410. For example, the first scene change detector 210-1 calculates a luminance level difference between frames of the video signal and detects whether the calculated luminance level difference is greater than a predetermined threshold value. If the luminance level difference is greater than the predetermined threshold value, it is determined that the scene change has occurred between frames of the video signal.

The high frequency inserter 210-2 changes the audio signal whenever the scene change is detected by the first scene change detector 210-1. That is, the high frequency inserter 210-2 inserts a high frequency component into the audio signal whenever the scene change is detected by the first scene change detector 210-1 in operation S420.

The Nyquist theorem defines that an original signal can be substantially reproduced by sampling an input signal at a sampling rate of more than two times the highest frequency of the input signal under a condition of canceling interference between codes in a digital transmission.

According to the Nyquist theorem, when the sampling rate is 40,000 Hz, the highest frequency of the sampled input signal is 20,000 Hz. Therefore, if the sampling rate is greater than 40,000 Hz, the high frequency inserter 210-2 can use a high frequency component of more than 20,000 Hz.

Since the sampling rate used by most digital systems is greater than 40,000 Hz, the high frequency component of more than 20,000 Hz can be shown in a digital domain. Therefore, the high frequency inserter 210-2 can insert a very high frequency component of more than 20,000 Hz into the audio signal to indicate a synchronization mark. The synchronization mark indicates where a scene change occurs in the video signal.

An audible frequency band of a human ear is between 20 and 20,000 Hz. Since the high frequency component inserted by the high frequency inserter 210-2 is greater than 20,000

Hz, the inserted high frequency component is beyond the audible frequency band. Therefore, even when the audio signal into which the high frequency component is inserted by the high frequency inserter 210-2 is reproduced, the inserted high frequency component is not detected by the human ear.

The audio signal into which the high frequency component is inserted progresses along the audio signal path, and the video signal progresses along the video signal path. During this progression, the post processing unit 230 causes the audio signal and the video signal to be unsynchronized.

The display unit 240 displays the video that progresses along the video signal path in operation S430. The light sensor 260-1 senses a luminance level of each pixel of each frame of the displayed video. The light sensor 260-1 may be an external light sensor. In other words, the light sensor 260-1 located in front of the display unit 240 tracks the video signal reproduced after a video post processing operation.

The second scene change detector 260-2 detects a scene change according to the sensed luminance level of each frame in operation S440.

For example, the second scene change detector 260-2 calculates the luminance level difference between frames (i.e., consecutive frames) according to the luminance level of each frame sensed by the light sensor 260-1 and detects whether the calculated luminance level difference is greater than a predetermined threshold value. If the luminance level difference is greater than the predetermined threshold value, the scene change detector 260-2 determines that the scene change has occurred.

While an output signal of the light sensor 260-1 is checked for indication of the scene change, the audio signal is continuously checked for the high frequency component. That is, the high frequency detector 260-3 detects the inserted high frequency component from the audio signal in operation S450.

The sync difference calculator 270 calculates a time difference between the time when the scene change is detected in the displayed video and the time when the high frequency component is detected in the audio signal according to an output signal of the second scene change detector 260-2 and an output signal of the high frequency detector 260-3 in operation S460. A sync difference between the audio signal path and the video signal path is determined according to the calculated time difference in operation S470.

The sync difference calculator 270 resynchronizes the audio signal and the video signal according to the determined sync difference in operation S480. That is, the sync difference calculator 270 controls buffering of the audio delay unit 220-2 and the video delay unit 220-1 according to the determined sync difference. Accordingly, the audio signal and the video signal are synchronized.

The present general inventive concept may be embodied in a computer by running a program from a computer-readable medium, including but not limited to storage media such as magnetic storage media (ROMs, RAMs, floppy disks, magnetic tapes, etc.), optically readable media (CD-ROMs, DVDs, etc.). The present general inventive concept may be embodied as a computer-readable medium having a computer-readable program code to cause a number of computer systems connected via a network to effect distributed processing.

As described above, according to the embodiments of the present general inventive concept, an audio signal and a video signal can be automatically synchronized without performing a separate measuring operation. Accordingly, an inconvenience that results from requiring a user to manually input audio signal delay parameters to synchronize the audio signal and the video signal is overcome.

By inserting a high frequency component (as opposed to a low frequency component) into an original audio signal to indicate timing of a scene change, the scene change can be detected when reproducing the audio signal is reproduced without the high frequency component being detected by human ears.

A delay caused by a post processing process of TVs can also be corrected by redetecting a scene change using a light sensor located at an outside of a display unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of synchronizing audio and video signals, the method comprising:
   displaying video on a screen including an audio signal including an inaudible frequency component having a predetermined pattern inserted therein to indicate when a scene change occurs in a corresponding video signal;
   detecting a scene change in the displayed video and detecting the inaudible frequency component having the predetermined pattern in the audio signal;
   calculating a time difference between a time when the scene change is detected in the displayed video and a time when the inaudible frequency component having the predetermined pattern is detected in the audio signal; and
   controlling delay times of the audio signal and the video signal according to the calculated time difference.

2. The method of claim 1, further comprising:
   inserting re-synchronization information into the audio signal before the operation of displaying the video on the screen.

3. The method of claim 2, wherein the inserting of the re-synchronization information into the audio signal comprises:
   detecting a luminance level per pixel of each frame of the video signal;
   calculating a luminance level difference between frames according to the detected luminance levels;
   detecting the scene change if the calculated luminance level difference is greater than a predetermined threshold value; and
   inserting the inaudible frequency component into the audio signal at a time when the calculated luminance level difference is greater than the predetermined threshold.

4. The method of claim 3, wherein the calculating of the luminance level difference between frames comprises:
   calculating a difference between a luminance level of a current frame and a luminance level of a previous frame for each pixel according to the luminance level per pixel of each frame; and
   calculating the luminance level difference between the current and previous frames by accumulating the calculated differences for each pixel.

5. The method of claim 1, wherein the inaudible frequency component having the predetermined pattern is a high frequency component that is beyond an audible frequency band.

6. The method of claim 1, wherein the detecting of the scene change comprises:
   detecting a luminance level of each frame of the displayed video;

calculating a luminance level difference between frames according to the detected luminance levels; and detecting the scene change if the calculated luminance level difference is greater than a predetermined threshold value.

7. A method of maintaining synchronization in video data, the method comprising:

synchronizing an audio signal with a video signal by inserting a synchronization mark into the audio signal when a scene changes in the video signal;

performing one or more signal processing operations on the video signal and the audio signal that introduce a relative delay between the video signal and the audio signal, respectively; and re-synchronizing the video signal and the audio signal to account for the relative delay by calculating a time difference between when the scene changes in a displayed video signal and when the synchronization mark is detected in the audio signal and delaying an output audio signal and an output video signal according to the time difference, wherein the synchronization mark comprises an inaudible high frequency component of more than 20,000 Hertz.

8. A method of resynchronizing video data using an apparatus to resynchronize video data, the method comprising:

receiving unsynchronized video data including a video signal and an audio signal having a relative delay therebetween, and the audio signal having one or more synchronization marks inserted therein to indicate when a scene changes in the video signal; and synchronizing the audio signal and the video signal to account for the relative delay by calculating a time difference between when the scene changes in a displayed video signal and when the synchronization mark is detected in the audio signal and delaying an output audio signal and an output video signal according to the time difference, wherein the synchronization mark is an inaudible frequency component.

9. The method of claim 8, further comprising:

displaying the video signal and detecting a scene change using a light sensor by comparing luminance levels between consecutive frames of the displayed video signal; and detecting the one or more synchronization marks in the audio signal.

10. A method of inserting synchronization information into video data using an apparatus to insert synchronization information into video data, the method comprising:

detecting when a scene changes in a video signal of the video data; and inserting a synchronization mark into an audio signal of the video data when the scene changes in the video signal to synchronize the video signal and the audio signal for output, wherein the detecting of when the scene changes comprises determining a luminance level for each pixel in a current frame of a displayed video signal, determining a difference between the luminance level of each pixel in the current frame and a luminance level of each pixel in a previous frame, accumulating each luminance level difference between the current frame and the previous frame, and determining whether the accumulated difference exceeds a predetermined threshold, wherein the synchronization mark is an inaudible frequency component.

11. A method of synchronizing audio and video signals using an audio and video synchronization apparatus, comprising:

determining a luminance level difference between current and previous frames of a video signal including an audio signal;

adding an identifier to the corresponding audio signal whenever the luminance level difference in the video signal is determined to be greater than a predetermined threshold value; and controlling delay of output of the audio signal and the video signal based on the added identifier and luminance level difference of a displayed video signal determined to be greater than the predetermined threshold value, wherein the identifier mark is an inaudible frequency component.

12. The method of claim 11, further comprising:

performing post processing operations on the delayed audio and video signals; and re-delaying output of the post processed audio and video signals based on the added identifier and luminance level difference of the video signal determined to be greater than the predetermined threshold value.

13. An audio and video synchronization apparatus, comprising:

a first scene change detector to calculate a luminance level difference between frames of a video signal and to detect whether the luminance level difference is greater than a predetermined threshold value;

an inaudible frequency inserter to insert an inaudible frequency component having a predetermined pattern into an audio signal whenever the first scene change detector detects that the luminance level difference is greater than the predetermined threshold value;

a signal detector to calculate a luminance level difference between frames from a screen on which the video is displayed, to detect whether the luminance level difference is greater than a predetermined threshold value, and to detect the inserted inaudible frequency component in the audio signal;

a sync difference calculator to calculate a time difference between a time when the signal detector detects that the luminance level difference is greater than the predetermined threshold value and a time when the inaudible frequency component is detected by the signal detector; and a delay unit to control buffering of the audio signal and the video signal according to the time difference calculated by the sync difference calculator.

14. The apparatus of claim 13, wherein the first scene change detector calculates a difference between a luminance level of a current frame and a luminance level of a previous frame for each pixel by detecting a luminance level per pixel of each frame of the video signal and calculates the luminance level difference between the current and previous frames by accumulating the calculated differences of each pixel.

15. The apparatus of claim 13, wherein the signal detector comprises:

a light sensor to sense a luminance level of each frame from a screen on which the video is displayed;

a second scene change detector to calculate a luminance level difference between frames according to the sensed luminance levels and to detect whether the calculated luminance level difference is greater than a predetermined threshold value; and an inaudible frequency detector to detect the inserted inaudible frequency component from the audio signal.

16. The apparatus of claim 13, further comprising:
a post processing unit to perform a first one or more processing operations on the audio signal and a second one or more processing operations on the video signal after the inaudible frequency component is inserted into the audio signal to indicate the scene change, and the first and the second one or more processing operations causing a first delay and a second delay in the post processed audio signal and the post processed video signal, respectively.

17. The apparatus of claim 16, wherein the time difference calculated by the sync difference calculator equals a difference between the first delay and the second delay.

18. The apparatus of claim 16, wherein:
the first one or more processing operations include at least one of 3D audio processing of the audio signal, virtualizing the audio signal, enhancing bass of the audio signal, enhancing dialog and clarity of the audio signal, and changing a format of the audio signal; and
the second one or more processing operations include at least one of enhancing color of the video signal, enhancing details of the video signal, enhancing contrast and brightness of the video signal, and changing a format of the video signal.

19. The apparatus of claim 13, wherein the delay unit comprises:
a variable audio buffer to delay outputting the audio signal according to the time difference calculated by the sync calculator; and
a variable video buffer to delay outputting the video signal according to the time difference calculated by the sync calculator.

20. The apparatus of claim 13, wherein the delay unit is disposed along a path between a signal change unit having the inaudible frequency inserter and the first scene change detector, and the signal detector, and further comprising:
a feedback line to provide the calculated time difference from the sync calculator back to the delay unit.

21. An apparatus to maintain synchronization of video data, comprising:
an audio video synchronization unit, comprising:
a signal change unit to insert a synchronization mark into an audio signal of the video data when a scene changes in a video signal of the video data;
a post processing unit to perform one or more signal processing operations on the video signal and the audio signal that introduce a relative delay between the video signal and the audio signal, respectively; and
a resynchronization unit to resynchronize the video signal and the audio signal to account for the relative delay by calculating a time difference between when the scene changes in a displayed video signal and when the synchronization mark is detected in the audio signal and delaying an output audio signal and an output video signal based on the time difference,
wherein the synchronization mark is an inaudible frequency component.

22. The apparatus of claim 21, further comprising:
an audio decoding apparatus to receive the video data including the video signal and the audio signal from an external source, to decode the video signal and the audio signal, and to provide the decoded video signal and the decoded audio signal to the audio video synchronization unit.

23. The apparatus of claim 21, further comprising:
a display unit to output the video signal; and
a light sensor to detect the scene change in the video signal and to provide a time when the scene changes in the video signal to the audio video synchronization unit.

24. The apparatus of claim 21, wherein the resynchronization unit comprises:
a signal detector to detect a time when the scene changes in the video signal and a time to when the synchronization mark is present in the audio signal;
a sync calculator to determine the time difference between when the scene changes in the video signal and when the synchronization mark is present in the audio signal; and
an audio delay unit to independently buffer the video signal and the audio signal to account for the determined time difference.

25. An apparatus to resynchronize video data, comprising:
a signal receiving unit to receive unsynchronized video data including a video signal and an audio signal having a relative delay therebetween, and the audio signal having one or more synchronization marks inserted therein to indicate when a scene changes in the video signal; and
a synchronizing unit to synchronize the audio signal and the video signal to account for the relative delay by calculating a time difference between when the scene changes in a displayed video signal and when the synchronization mark is detected in the audio signal and to delay an output audio signal and an output video signal according to the time difference,
wherein the one or more synchronization marks are an inaudible frequency components.

26. The apparatus of claim 25, further comprising:
a display unit to display the video signal;
a light sensor to detect a scene change by comparing luminance levels between consecutive frames of the displayed video signal; and
an audio detection unit to detect the one or more synchronization marks in the audio signal.

27. An apparatus to insert synchronization information into video data, comprising:
a scene detecting unit to detect when a scene changes in a video signal of the video data; and
an inserting unit to insert a synchronization mark into an audio signal of the video data when the scene changes in the video signal,
wherein the scene detecting unit detects when the scene changes by determining a luminance level for each pixel in a current frame of a displayed video signal, determining a difference between the luminance level of each pixel in the current frame and a luminance level of each pixel in a previous frame, accumulating each luminance level difference between the current frame and the previous frame, and determining whether the accumulated difference exceeds a predetermined threshold,
wherein the synchronization mark is an inaudible frequency component.

28. An apparatus to synchronize video data including a video signal and an audio signal, comprising:
a signal modification unit to modify an audio signal by adding an identifier thereto whenever a scene change is detected in a corresponding video signal;
a delay unit to delay the modified audio signal and the corresponding video signal for synchronization;
a post processing unit to perform process operations on the modified audio signal and the corresponding video signal and to output the processed audio signal and corresponding video signal; and a resynchronization unit to control the delay unit to resynchronize the modified audio signal and corresponding video signal based on a delay therebetween caused by the post processing unit, wherein the delay corresponds to a time difference between when the scene changes in a displayed video signal and when the identifier is detected in the audio signal, wherein the identifier mark is an inaudible frequency component.

29. A computer readable medium having executable code to synchronize audio and video signals, the medium comprising:

a first executable code to output a video data including a video signal and corresponding audio signal including an inaudible frequency component having a predetermined pattern inserted therein to indicate when a scene change occurs in the video signal;

a second executable code to detect a scene change in the output video data and to detect the high frequency component having the predetermined pattern in the audio signal;

a third executable code to calculate a time difference between a time when the scene change is detected in a displayed video data and a time when the high frequency component having the predetermined pattern is detected in the audio signal; and a fourth executable code to control delay times of the audio signal and the video signal according to the calculated time difference.

30. The apparatus of claim 13, wherein the inaudible frequency component having the predetermined pattern is a high frequency component that is beyond an audible frequency band.

31. The medium of claim 29, wherein the inaudible frequency component having the predetermined pattern is a high frequency component that is beyond an audible frequency band.

* * * * *